INVENTOR.
RICHARD D. HOUK

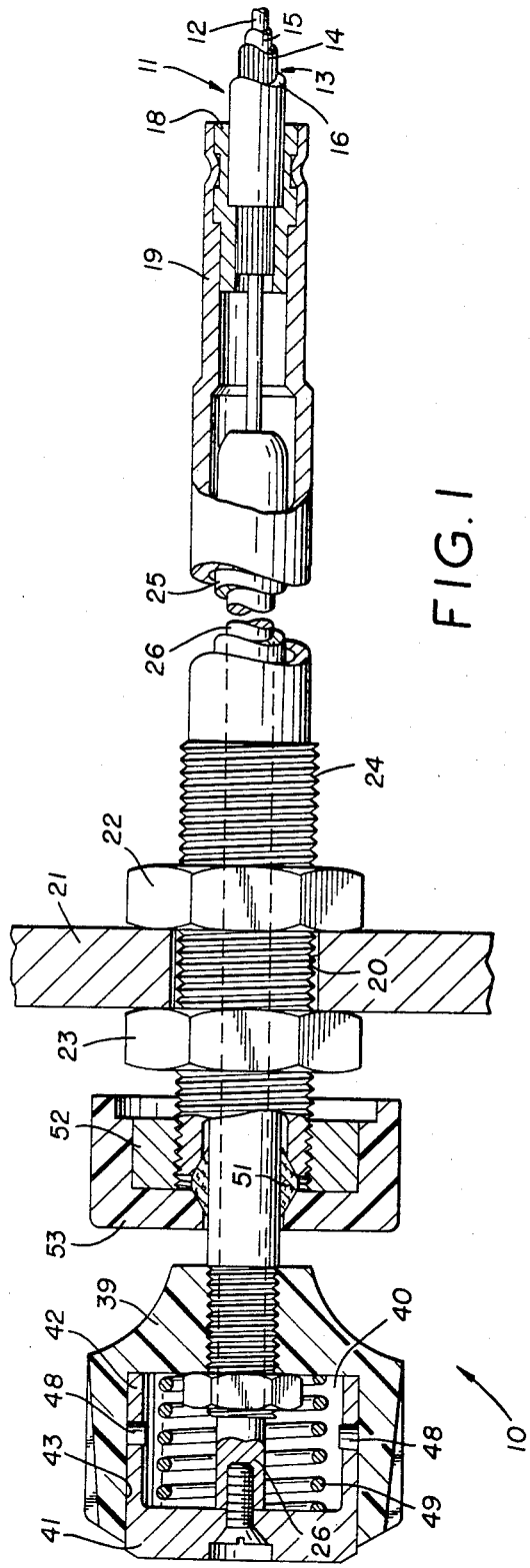

United States Patent Office 3,405,567
Patented Oct. 15, 1968

3,405,567
SELECTIVE VERNIER CONTROL
Richard D. Houk, Stow, Ohio, assignor to Morse Controls Inc., Hudson, Ohio, a corporation of Ohio
Filed Mar. 1, 1967, Ser. No. 619,863
3 Claims. (Cl. 74—502)

ABSTRACT OF THE DISCLOSURE

A control device for moving the core of a push-pull control cable with respect to the casing thereof in gross amounts and, selectively, in accurately fine, or vernier, increments. The control device has a primary and secondary knob means, the secondary knob movable between, and selectively retainable in, a first and second position so that the device will accommodate either gross or fine control upon actuation of the primary knob means.

Background of the invention

Push-pull control cables are generally well known to the art as devices capable of transmitting mechanical motion in either direction when at least the ends of the cable casing are satisfactorily clamped in position. Push-pull cables, being flexible, are particularly suitable for installations where the cable is required to extend through a number of bends between a control station and a remote controlled station. Such cables are constructed to have a core slidably received in a supporting casing and are commonly utilized in conjunction with such devices as throttle controls. For many such installations it is imperative that the control be capable of providing not only quick major adjustments in gross but also fine, accurate vernier adjustments.

Heretofore, several known control devices have been employed to provide such a result. One known construction utilizes a tubular support attached to the cable casing. A tubular adjusting member is slidably received within the support and is connected to the cable core. The adjusting member, in turn, has a release rod slidably received therein for positioning a ball-like engaging member into and out of mating engagement with the threaded interior of the tubular support member.

A primary control knob is secured to the adjusting member and coaxially receives a secondary control knob secured to the release rod. To make vernier adjustment the operator need only turn the primary control knob in the appropriate direction. However, for gross adjustment the operator is required to actuate the secondary control knob axially with respect to the primary knob and, while holding the secondary control knob so actuated against the biasing action of a spring means, move the primary control knob axially in the desired direction.

Under even the most favorable conditions considerable manual dexterity is required to operate such a control. In moments of stress the results can be disastrous.

Summary of the invention

It is therefore a primary object of the present invention to provide, for the core of a push-pull control cable, a control device capable of selective gross or vernier adjustments.

It is another object of the present invention to provide a control device, as above, which can be set to provide immediate gross or vernier control without the necessity of continuous dextrous manipulation.

It is a further object of the present invention to provide a control device, as above, which is relatively uncomplex and economical.

It is an even further object of the present invention to provide a control device, as above, which can be converted from at least one prior known construction with only a modest substitution of parts.

These and other objects which will become apparent from the following specification are accomplished by means hereinafter described and claimed.

In general, a control device according to the concept of the present invention utilizes a primary control knob secured to a control sleeve, and a secondary control knob secured to an actuating rod. The secondary control knob is received within the primary knob for axial movement of the secondary control knob with respect to the first knob between an outer and an inner position. The outer position, preferably, permits vernier control.

Additionally, the secondary knob is rotatable within the primary knob, and a bayonet means interconnects the primary and secondary knobs to provide selective locking of the secondary knob in the inner position. A spring means continuously biases the secondary knob toward the outer position.

One preferred embodiment is shown by way of example in the accompanying drawing and described in detail without attempting to show all of the various forms and modifications in which the invention might be embodied; the invention being measured by the appended claims and not the details of the specification.

Description of the drawings

FIG. 1 is a side elevation, partly broken away and partly in section, depicting a push-pull control cable operatively connected to a control device embodying the concept of the present invention;

FIG. 2 is an enlarged cross sectional area of FIG. 1 depicting the connection of the control device to the core and casing of the push-pull control cable as well as that portion of the control device by which vernier control is effected; and, FIG. 3 is an exploded perspective depicting a preferred form of the bayonet interlocking means between the primary and secondary control knob.

Description of a preferred embodiment

Figure 3:
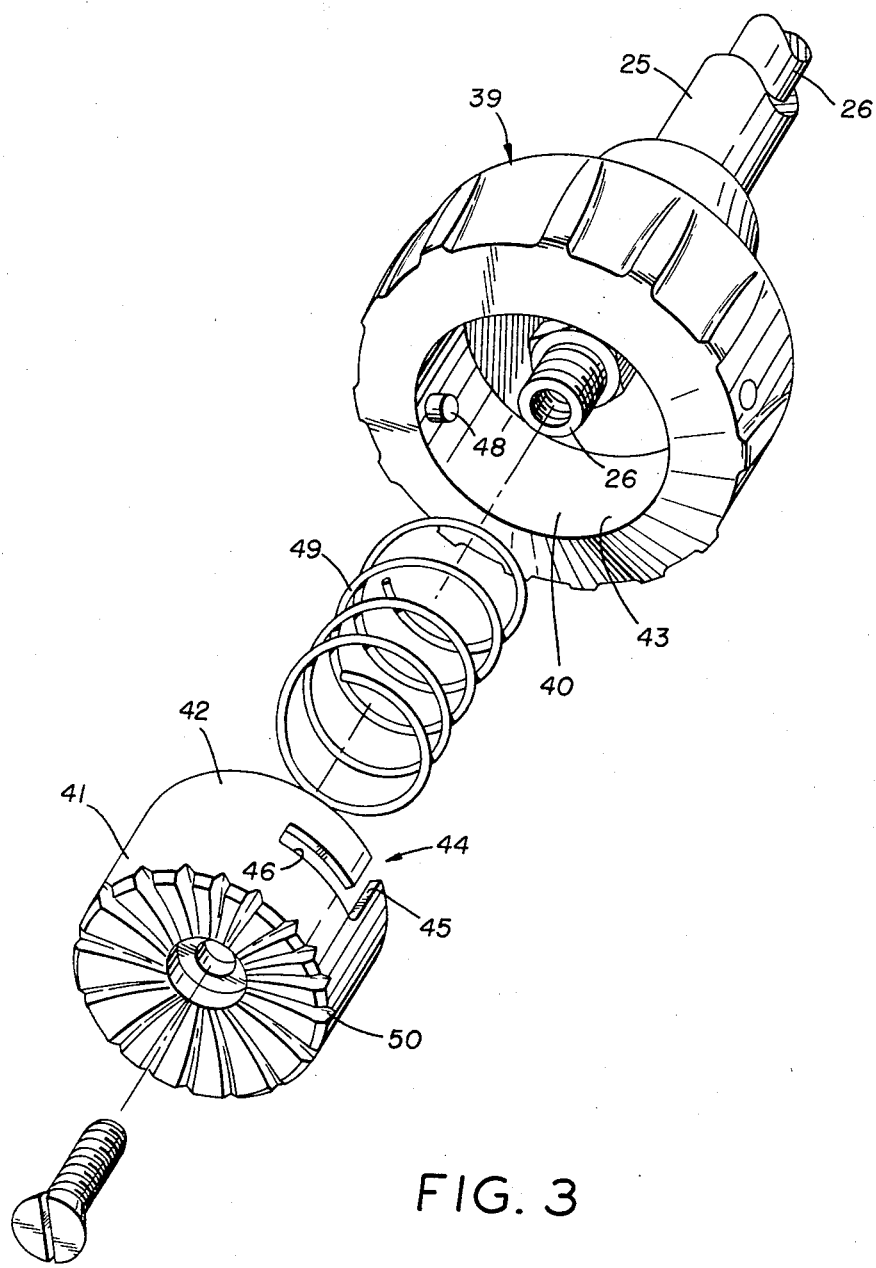

Referring more particularly to the drawings, the subject control device is indicated generally by the numeral 10 and is depicted as being operatively attached to a push-pull control cable assembly 11. A push-pull control cable assembly 11 includes the core 12 and the casing 13 in which the core is reciprocally slidable.

The prior art knows many casing constructions one of which is depicted environmentally herein and comprises a plurality of wires 14 contiguously laid in the form of a helical coil about the radially outer surface of an inner, flexible tube 15 which extends the full length of the casing 13. An outer, flexible cover 16 encases the coil of wires 14 and extends along the entire casing to within a short distance from the end of the wires 14.

A fitting 18 is fitted over the end of the wires 14 and cover 16 and is securely attached thereto, as by swaging. Connected to the fitting 18, and thereby the cable casing 13, is the tubular housing 19 of control device 10. The housing 19 of the control device may be mounted directly through a suitable opening 20 such as shown in instrument panel 21. Thus positioned, a pair of positioning nuts 22 and 23 received on the external threaded portion 24 of the housing 19 may be secured against the opposed faces of the panel 21 to fasten the device 10 in the desired location.

Slidably received within the tubular housing 19 is a control sleeve 25. Enclosed within the control sleeve 25 is an actuating rod 26. The actuating rod 26 is slidable within the control sleeve 25 and has a plug portion 28 attached to one end. The plug portion 28 presents a conical work face 29 which opposingly faces the shaft of the actuating rod 26 and engages a thrust ball 30.

The thrust ball 30 is movable inwardly and outwardly through a radial aperture 31 in the control sleeve 25. In its radially outermost position the thrust ball 30 meshingly engages the threads 32 on the interior of the tubular housing 19 to provide vernier control, as more fully hereinafter described.

In providing such vernier control it is necessary that the control sleeve 25 and the release rod 26 rotate relative to the tubular housing 19, and, because the cable core 12 is often attached at the remote controlled station in such a way that rotation thereof would be undesirable, it is preferable that the control sleeve 25 and the actuating rod contained therein be rotatably attached to the core 12. An exemplary construction is depicted in FIG. 2. The end of the control cable core 12 is swaged or otherwise affixed to a swivel cylinder 33, and the cylinder 33 is rotatably received within the control sleeve 25. Two positioning washers 34 and 35 engage the ends of the cylinder 33 and maintain it against axial displacement with respect to the control sleeve 25. Washer 34 is retained in position by a dimple crimp 36, and washer 35 is retained by end crimp 38.

The opposite end of the control sleeve 25 extends outwardly of the housing 19 and has the primary control knob 39 fixedly mounted thereon. The face of the primary knob 39 opposite sleeve 25 is relieved, as at 40, so that the secondary control knob 41 can be received therein for both axial and rotational movement with respect to the primary control knob 39.

The secondary control knob 41 is nonrotatably secured to the end of the actuating rod 26 which extends outwardly of the control sleeve 25 and into the relieved cavity 40 within the primary control knob 39.

The secondary control knob has a skirt 42 which extends axially into the cavity 40 and lies in juxtaposition with the annular wall 43 which defines the radial periphery of the cavity 40. The skirt 42 is provided with at least one, and preferably two, bayonet slots 44. Each bayonet slot 44 has an axial leg 45 which conjoins with a transverse, circumferentially oriented leg 46.

A lug, or pin, 48 extends radially inwardly of the annular wall 43 for interengagement with each bayonet slot 44. So long as the pin 48 is received in the axial leg 45 of slot 44 the compression spring 49 received within cavity 40 tends to move the secondary control knob 41 axially outwardly of the primary control knob 39. This results in forcing the work face 29 on plug portion 28 against the thrust ball 30 so that it is maintained in meshing interengagement with the threads 32 on the interior of the tubular housing 19. In this position the core 12 of the push-pull cable can only be translated by rotation of the primary knob 39—thus effecting vernier control.

Should it be desired to effect control in gross, the secondary knob 41 is depressed against the biasing action of spring 49 to withdraw the work face 29 from the thrust ball 30. This permits straight translation of the control knob 39 for a corresponding translation of the core 12. Of course, the dexterity required to maintain the secondary control knob 41 depressed while, at the same time, axially translating the primary knob 39 to effect control in gross can be extremely difficult and at times actually hazardous. To overcome this highly undesirable situation, the bayonet means provided permits selective maintenance of the secondary control knob 41 in its axially innermost, or depressed, position.

The operator depresses the secondary knob 41 so that the pin 48 traverses the full length of the axial leg 45 of slot 44 and then, by applying a twisting motion to the secondary knob 41, the pin 48 enters the transverse leg 46, thus restraining the secondary knob 41 against the biasing action of spring 49 in the depressed position. With the secondary knob so retained the primary knob 39 can be translated as desired to provide in gross control.

By providing the face of the secondary control knob 41 with a nonslip surface, such as the serrations 50, the operator can engage the secondary knob 41 with his thumb, for example, depress and rotate the knob for a substantially instantaneous conversion from vernier to gross control. To return to vernier control the operator counterrotates the secondary knob 41 with respect to the primary knob 39 and as soon as the pin 48 aligns with the axial leg 45 of bayonet slot 44 the spring 49 biases the knob 41 to its outermost position with corresponding reengagement of the thrust ball 30 with threads 32, as hereinbefore more fully described.

As is quite customary with vernier controls, a means for variably adjusting the sliding friction of the control sleeve 25 within the housing 19 may also be provided. Typical of such a means is the use of a packing material 51 within a stuffing box 52 provided in the outermost end of the housing and variably compressible against the sleeve 25 by a gland 53.

The subject control thereby accomplishes the objects of the invention.

What is claimed is:

1. A vernier control device for a push-pull control cable having a core and a casing, said control device comprising a tubular housing secured to said control cable casing, thread means on the interior of said housing, a control sleeve slidably received in said housing, one end of said control sleeve rotatably secured to said control cable core, a primary control knob having a relieved cavity which has an annular peripheral wall, the other end of said control sleeve affixed to said primary control knob, an actuating rod received in said control sleeve, a thread engaging means movable generally radially of said control sleeve into and out of engagement with the thread means on the interior of said tubular housing in response to axial movement of said actuating rod, a secondary control knob affixed to said actuating rod and movable axially with respect to said primary control knob between an outermost and innermost position to define interengagement and disengagement of said thread engaging means with said thread means, said secondary control knob being provided with a skirt receivable within said relieved cavity, biasing means urging said secondary control knob toward said outermost position, a pin means, and a bayonet slot, said pin means and beyonet slot being provided on said skirt and peripheral wall, selective interlocking of said pin means and said bayonet slot retaining said secondary control knob in said innermost position.

2. A vernier control device, as set forth in claim 1, in which the pin is radially oriented and the bayonet slot is comprised of an axial leg and a transverse leg.

3. A vernier control device, as set forth in claim 2, in which the pin is mounted on and extends radially inwardly of the peripheral wall and the bayonet slot is provided in said skirt with the transverse leg thereof being oriented generally circumferentially thereof.

References Cited

UNITED STATES PATENTS 2,273,334   2/1942   Shakespeare _____ 74—503

FOREIGN PATENTS 765,939   3/1934   France.

FRED C. MATTERN, JR., *Primary Examiner.*

C. F. GREEN, *Assistant Examiner.*